(12) United States Patent
Grant et al.

(10) Patent No.: US 7,080,023 B2
(45) Date of Patent: Jul. 18, 2006

(54) CRAFTSMANSHIP RATING SYSTEM AND METHOD

(75) Inventors: Barry Steven Grant, Berkley, MI (US); Dawn Gietzen, Canton, MI (US); David Pericak, Clinton Twp., MI (US); Ray Wright, II, Detroit, MI (US)

(73) Assignee: Ford Motor Company, Dearborn, MI (US)

( * ) Notice: Subject to any disclaimer, the term of this patent is extended or adjusted under 35 U.S.C. 154(b) by 1118 days.

(21) Appl. No.: 09/682,250

(22) Filed: Aug. 9, 2001

(65) Prior Publication Data

US 2003/0033189 A1    Feb. 13, 2003

(51) Int. Cl.
*G06F 17/60* (2006.01)
(52) U.S. Cl. .......................................... 705/7; 705/10
(58) Field of Classification Search ................. 705/7, 705/10
See application file for complete search history.

(56) References Cited

U.S. PATENT DOCUMENTS

| | | | |
|---|---|---|---|
| 4,788,716 A | 11/1988 | Zebe | |
| 5,038,367 A | 8/1991 | Casey et al. | |
| 5,392,095 A | 2/1995 | Siegel | |
| 5,913,204 A | 6/1999 | Kelly | |
| 5,940,471 A | 8/1999 | Homayoun | |
| 5,970,121 A | 10/1999 | Homayoun | |
| 6,317,666 B1 * | 11/2001 | List et al. .................... 701/29 |
| 6,577,971 B1 * | 6/2003 | Aitken et al. ................. 702/81 |
| 6,912,502 B1 * | 6/2005 | Buddle et al. ................. 705/1 |
| 6,952,679 B1 * | 10/2005 | Pulford .......................... 705/7 |

FOREIGN PATENT DOCUMENTS

JP    409171346 A  *  6/1997

OTHER PUBLICATIONS

Watkins (Managing Cross-Functional Problem-Solving: A Study Of Liftgate Engineering At Ford of Europe); Dec. 1992; Harvard University vol. 53/05-A; Dialog file 35, Accession No. 01238663.*

\* cited by examiner

*Primary Examiner*—Romain Jeanty
(74) *Attorney, Agent, or Firm*—Gary A. Smith (57) ABSTRACT

A system and method of craftsmanship rating of vehicles includes the steps of receiving customer data relating to craftsmanship for a vehicle and building a component/system database from the collected customer data. The method also includes the steps of rating the vehicle for craftsmanship based on component/system database to obtain an actual rating and setting a target rating for the vehicle based on the actual rating. The method includes the steps of identifying craftsmanship issues that resolve a gap from the actual rating to the target rating. The method further includes the steps of determining whether the identified craftsmanship issues will resolve the gap from the actual rating to the target rating.

20 Claims, 10 Drawing Sheets

| Vehicle Information Screen | ☒ |
|---|---|

GCARS Vehicle Information Screen

Auditors
Name #1 [                    ]   Name #3 [                    ]
Name #2 [                    ]   Name #4 [                    ]

File Information
File Name [testing3.mdb]   Report Alias [        ]   Date [5/23/01]

Vehicle Information
Model Year [    ]   Manufacturer [        ]   Model Name [        ]
Transmission [      ▽]   Body Type/Style [      ]   Engine [      ]
Interior Seat Color [      ]   Exterior Color [      ]   Interior Seat Material [      ]
Program Name [      ]   Production Phase [      ]   VIN [      ]
Plant [      ]   Price [    ]   Mileage [    ]   Market Segment [    ]
Series Based on Trim Level [      ▽]   Audit Type [U.S. CAR ▽]

General Comments [                                        ]

[ Save ]

FIG. 4.

| Rate the Component | |
|---|---|
| EX1026 EXTERIOR SIDE | [CE] |
| high frontdoor exterior lock cylinder | |

Component Status
☐ Present?   ☐ COE?   [Comment]

| visual expectation | high | findability | high |
| visual compatibility | medium | accessibility | high |
| fit | high | operability | high |
| illumination apperance | low | | |
| functional sound expectation | medium | | |
| sound compatibility | low | | |
| touch expectation | high | | |
| functional feel expectation | high | | |
| touch/feel compatibility | low | | |

Actual  Demerits  CE's
  0      0

[Next Attr.]  [RATE]

---

Select Component

NR NP side view mirror
NR NP sail panel
NR NP front door side glass
NR NP front door window molding
NR NP front door side glass seal (exposed & behind glass)
NR NP keyless entry pad
NR NP key fob
NR NP front door exterior lock cylinder
NR NP front door exterior handle
NR NP front door exterior handle bezel
NR NP front door inner
NR NP front door inner air extractors
NR NP front door inner seal
NR NP front door opening inner
NR NP front door opening air extractors
NR NP front door opening seal/garnish molding
NR NP front door hinges
NR NP front door striker
NR NP outer – front door scuff plate
NR NP b-pillar outer
NR NP b-pillar applique
NR NP rear door (system)
NR NP rear door outer

[Search]  [Return]

Zone Select         Component Select
[All Zones]         [All Components]

[Prev] [Skip Prev]  [Skip Next] [Next] [Close]

Base Score

| | Minor | Major |
|---|---|---|
| Low | 3 | 6 |
| Medium | 6 | 12 |
| High | 9 | 18 |

Major Base Score Criteria
>=3 Minor Issues
>=1 Major Issue

Global Craftsmanship Scoring Proposal

Basic Equation: Base Score + (Sum Of All Issue Demerits) = Component Demerit Score Issue Demerits: Component Value x Attribute Value x Issue Multiplier = Demerits/Issue

Issue Demerits

| Component Weight | Component Value | | Attribute Weight | Attribute Value | | Minor Issue Multiplier | | Demerit Score | And/Or | Major Issue Multiplier | | Demerit Score | And/Or | Customer Dissatisfier Demerit Score |
|---|---|---|---|---|---|---|---|---|---|---|---|---|---|---|
| Low | 1 | x | Low | 1 | x | 1 | = | 1 | | x 2 | = | 2 | | 100 |
| | | x | Medium | 2 | x | 1 | = | 2 | | x 2 | = | 4 | | |
| | | x | High | 3 | x | 1 | = | 3 | | x 2 | = | 6 | | |

| Component Weight | Component Value | | Attribute Weight | Attribute Value | | Minor Issue Multiplier | | Demerit Score | And/Or | Major Issue Multiplier | | Demerit Score | | Demerit Score |
|---|---|---|---|---|---|---|---|---|---|---|---|---|---|---|
| Medium | 2 | x | Low | 1 | x | 1 | = | 2 | | x 2 | = | 4 | | 100 |
| | | x | Medium | 2 | x | 1 | = | 4 | | x 2 | = | 8 | | |
| | | x | High | 3 | x | 1 | = | 6 | | x 2 | = | 12 | | |

| Component Weight | Component Value | | Attribute Weight | Attribute Value | | Minor Issue Multiplier | | Demerit Score | And/Or | Major Issue Multiplier | | Demerit Score | | Demerit Score |
|---|---|---|---|---|---|---|---|---|---|---|---|---|---|---|
| High | 3 | x | Low | 1 | x | 1 | = | 3 | | x 2 | = | 6 | | 100 |
| | | x | Medium | 2 | x | 1 | = | 6 | | x 2 | = | 12 | | |
| | | x | High | 3 | x | 1 | = | 9 | | x 2 | = | 18 | | |

FIG. 7A.

| | | Current | Minor Calls | Major Calls | C.D. | Proposed |
|---|---|---|---|---|---|---|
| Front door system | H | 200 | | | | 90 |
| Base score | | 0 | | | | 18 |
| Functional Sound Expectation | H | 50 | 0 | 1 | | 18 |
| Functional Feel Expectation | H | 50 | 0 | 1 | | 18 |
| Operability | H | 100 | 0 | 2 | | 36 |
| Hood (system) | H | 25 | | | | 18 |
| Base score | | 0 | | | | 9 |
| Operability | H | 25 | 1 | 0 | | 9 |
| Hood scoop | M | 18 | | | | 14 |
| Base score | | 0 | | | | 6 |
| Visual Expectation | M | 9 | 1 | 0 | | 4 |
| Fit | M | 9 | 1 | 0 | | 4 |
| Front Grille | H | 50 | | | | 36 |
| Base score | | 0 | | | | 18 |
| Visual Expectation | H | 50 | 0 | 1 | | 18 |
| Front Washer nozzle | M | 3 | | | | 8 |
| Base score | | 0 | | | | 6 |
| Visual Compatibility | L | 3 | 1 | 0 | | 2 |

FIG. 7B.

Global Craftsmanship Scoring Proposal

Enhancements by Attribute

| Component Weight | Attribute Weight | Attribute Enhancements |
|---|---|---|
| Low | Low | 2 |
|  | Medium | 4 |
|  | High | 6 |

| Component Weight | Attribute Weight | Attribute Enhancements |
|---|---|---|
| Medium | Low | 4 |
|  | Medium | 8 |
|  | High | 12 |

| Component Weight | Attribute Weight | Attribute Enhancements |
|---|---|---|
| High | Low | 6 |
|  | Medium | 12 |
|  | High | 18 |

Enhancements by Component

| Component Weight | Component Enhancement |
|---|---|
| Low | 24 |

| Component Weight | Component Enhancement |
|---|---|
| Medium | 48 |

| Component Weight | Component Enhancement |
|---|---|
| High | 72 |

BASE SCORES:

| Comp. Weight | Base Scores |
|---|---|
| Low | 6 |
| Medium | 12 |
| High | 18 |

FIG. 8.

| ISSUE NUMBER | X-FUNCTIONAL TEAM/PMT | FUNCTIONAL AREA | PART NAME | FCPA ATTRIBUTE EFFECTED | DEFECT CODE | ISSUE DESCRIPTION | ISSUE CLASSIFICATION | Status | Target | Milestone | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|
| | | | | | | | | | | <SI> | | <SC> | | <PA> | | <ST> | | <PR> | | <CP> | | <LR> | | <PP> | | <EU> | | <CB> | | <IB> | | <J1> | |
| | | | | | | | | | | Demerit | Enhancement | Demerit | Enhancement | Demerit | Enhancement | Demerit | Enhancement | Demerit | Enhancement | Demerit | Enhancement | Demerit | Enhancement | Demerit | Enhancement | Demerit | Enhancement | Demerit | Enhancement | Demerit | Enhancement | Demerit | Enhancement |

FIG. 9A.

| CP-J1 | | | | | | | | | | | | | | | | | | | | | | | | | | |
|---|---|---|---|---|---|---|---|---|---|---|---|---|---|---|---|---|---|---|---|---|---|---|---|---|---|---|
| DEMERIT SCORES ON CP VEHICLES | | | | | | | | | | | PROJECTION | | | | | | | | | | | | | | | |
| Vehicle # 1 | Vehicle # 2 | Vehicle # 3 | Vehicle # 4 | Vehicle # 5 | Vehicle # 6 | Vehicle # 7 | Vehicle # 8 | Vehicle # 9 | Vehicle #10 | Ave. of last three | IPP Confidence | IPP Projection | FEU Confidence | FEU Projection | CB Confidence | CD Projection | J1 Confidence | J1 Projection | AIMS NUMBER | AIMS STATUS (O/C/P) | WERS CONCERN# | CONCERN STATUS (W,A,C) | RESPONSIBLE ENGINEER | SUPPLIER | CORRECTIVE ACTION | VERIFY DATE | EFFECTIVE IN DATE | NEXT RENEW DATE |

FIG. 5B.

CRAFTSMANSHIP RATING SYSTEM AND METHOD

BACKGROUND OF INVENTION

The present invention relates generally to systems and methods of rating vehicles and, more specifically, to a system and method for rating craftsmanship of a vehicle.

It is known to provide a quality or craftsmanship rating system for a vehicle manufacturer to evaluate its vehicles. In the craftsmanship rating system, a value of zero to six may be given to a component on a vehicle such as a door handle to form a rating of craftsmanship. Typically, a value of three was a standard in the automotive vehicle industry. The value was then recorded on a spreadsheet for a particular vehicle model. Calculations were manually performed on the numbers recorded in the spreadsheet for a total on each component of the vehicle model. However, guidelines for corrective action regarding craftsmanship on each component were manually determined and subjective.

One disadvantage of the above system is that it is not customer based, is not linked to a roadmap, and does not prioritize the vehicle holistically. As a result, it is desirable to provide a craftsmanship rating system for vehicles that creates a roadmap for corrective actions. It is also desirable to provide a craftsmanship rating system for vehicles that prioritizes craftsmanship of the vehicle in a holistic manner.

SUMMARY OF INVENTION

Accordingly, the present invention is a system and method of rating craftsmanship for vehicles. The system and method include a computer for receiving customer data relating to craftsmanship for a vehicle and building a component/system database from the customer data. The system and method also includes rating the vehicle for craftsmanship based on component/system database to obtain an actual rating and setting a target rating for the vehicle based on the actual rating. The system and method further include identifying craftsmanship issues that resolve a gap from the actual rating to the target rating and determining whether the identified craftsmanship issues will resolve the gap from the actual rating to the target rating.

One advantage of the present invention is that a system and method is provided for rating craftsmanship of vehicles. Another advantage of the present invention is that the craftsmanship rating system and method is a web-based tool of capturing, organizing, and using customer data to develop a rating system for vehicles. Yet another advantage of the present invention is that the craftsmanship rating system and method automatically populates and creates a roadmap for corrective actions to craftsmanship issues in vehicles. Still another advantage of the present invention is that the craftsmanship rating system and method allows a vehicle manufacturer to evaluate their vehicles in the eyes of the customer. A further advantage of the present invention is that the craftsmanship rating system and method captures customer opinion and uses this data to formulate and populate a new rating system. Still a further advantage of the present invention is that craftsmanship rating system links this information to a roadmap, through automatic population, as a tool for vehicle program teams to prioritize corrective actions for current/new vehicle model programs.

Other features and advantages of the present invention will be readily appreciated, as the same becomes better understood, after reading the subsequent description taken in conjunction with the accompanying drawings.

BRIEF DESCRIPTION OF DRAWINGS

FIG. 6 is a screen image of a report used in accordance with the method of FIG. 2.

DETAILED DESCRIPTION

Figure 1:
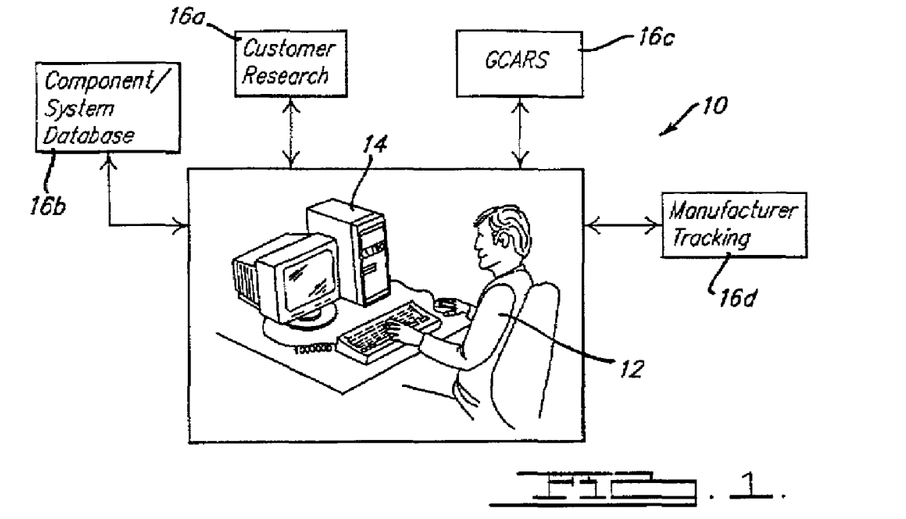
FIG. 1 is a diagrammatic view of a system, according to the present invention, for rating craftsmanship of vehicles illustrated in operational relationship with an operator.

Referring to FIG. 1, one embodiment of a system 10, according to the present invention, of rating craftsmanship for vehicles is illustrated. In the present invention, an operator 12 uses the system 10 to perform a craftsmanship rating method. The system 12 includes a computer 14 to send and receive information to and from various sources 16a, 16b, 16c, and 16d via an electronic link. The computer 14 has a memory, a processor, a display and user input mechanism, such as a mouse or keyboard. The craftsmanship rating method is implemented on the computer 14 in Basic and the database is written in Microsoft Access, coupled with other lower level languages. It should be appreciated that the system 10 may include a hand-held device (not shown) such as a Palm Pilot™ to input information which is downloaded to the computer 14.

Figure 2:
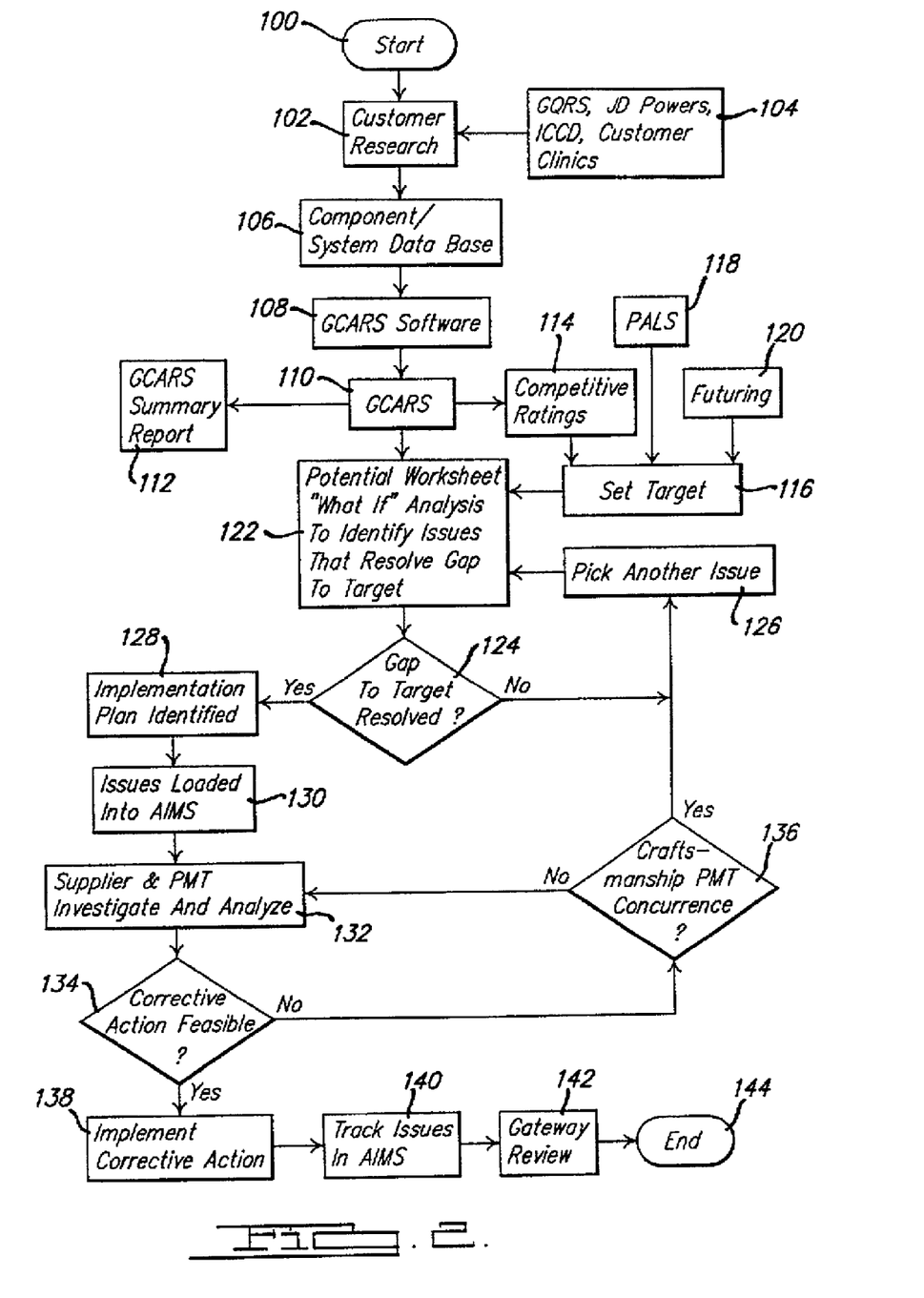
FIG. 2 is a flowchart of a method, according to the present invention, of rating craftsmanship for vehicles using the system of FIG. 1.

Referring to FIG. 2, a method, according to the present invention, of rating craftsmanship for vehicles is shown. The method starts in bubble 100 and advances to block 102. In block 102, the method collects customer research in the form of customer data as it relates to craftsmanship. The customer data may be from a customer research source such as a Global Quality Research System (GQRS), JD Powers, Intensified Customer Concern Definition (ICCD), and/or Customer Scenario Clinics in block 104 as an input to block 102, which the computer 14 receives. For example, the rating system 10 is based on customer scenarios such as showroom, lifestyle, and maintenance and various events and tasks within the scenarios that the customer would perform while using the vehicle. It should be appreciated that the customer will have to recall their personal experiences with vehicles in order to understand what components they interact with and what about that component is important while performing the tasks.

From block 102, the method advances to block 106 and builds a component/system database from the customer research in block 102. For example, a component may be a door handle while a system may be a fuel system of the vehicle. The customer data is fed into the database to prioritize and weight the various components that make up the vehicle. It should be appreciated that the database may be stored on the computer 14 or stored externally and accessed by the computer 14.

Figure 3:
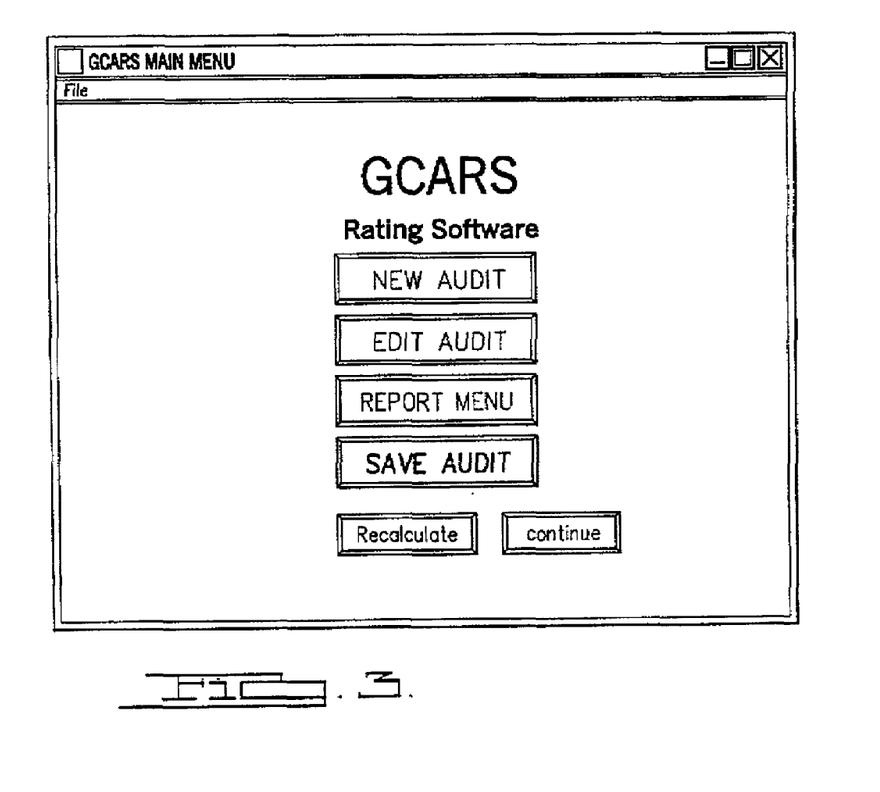
FIGS. 3 through 5 are screen images for rating software used in accordance with the method of FIG. 2.
Figure 4:
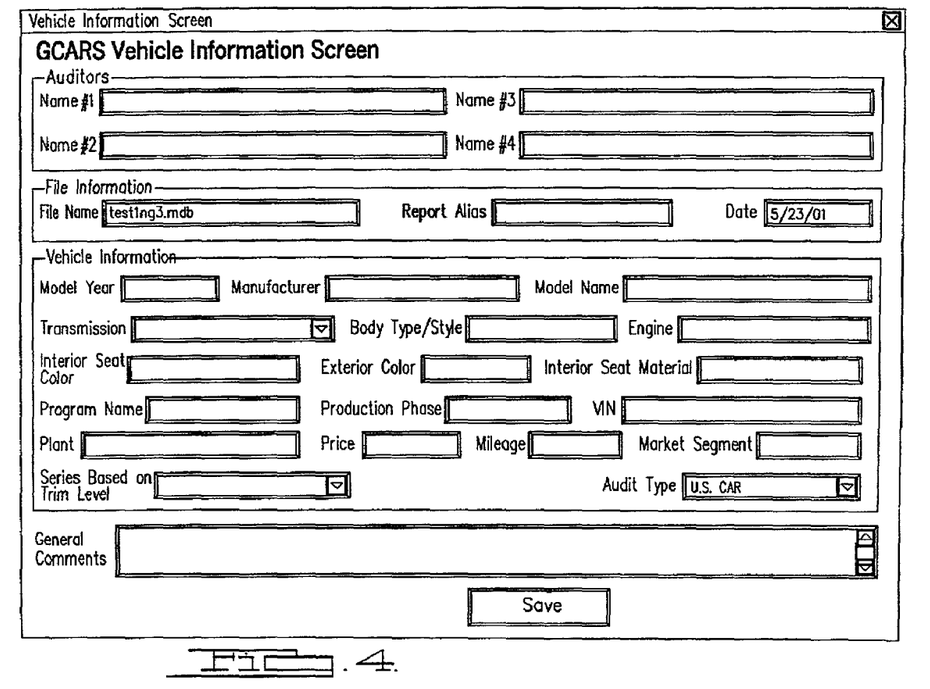
Figure 5:
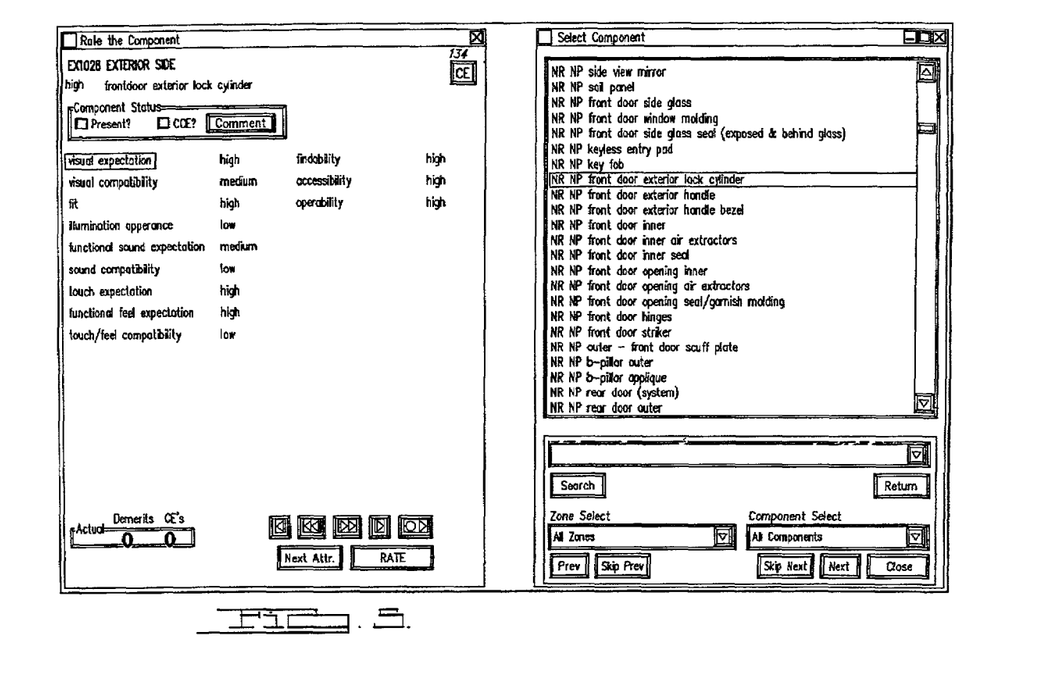

From block 106, the method advances to block 108 and performs a craftsmanship audit using a Global Craftsmanship Attribute Rating System (GCARS) software as illustrated in FIG. 3. The GCARS software is a menu driven program that acts as an interface to a human auditor (not shown) who rates the vehicles as illustrated in FIGS. 4 and 5. It should be appreciated that the software may be "web-"based.

Figure 7A:
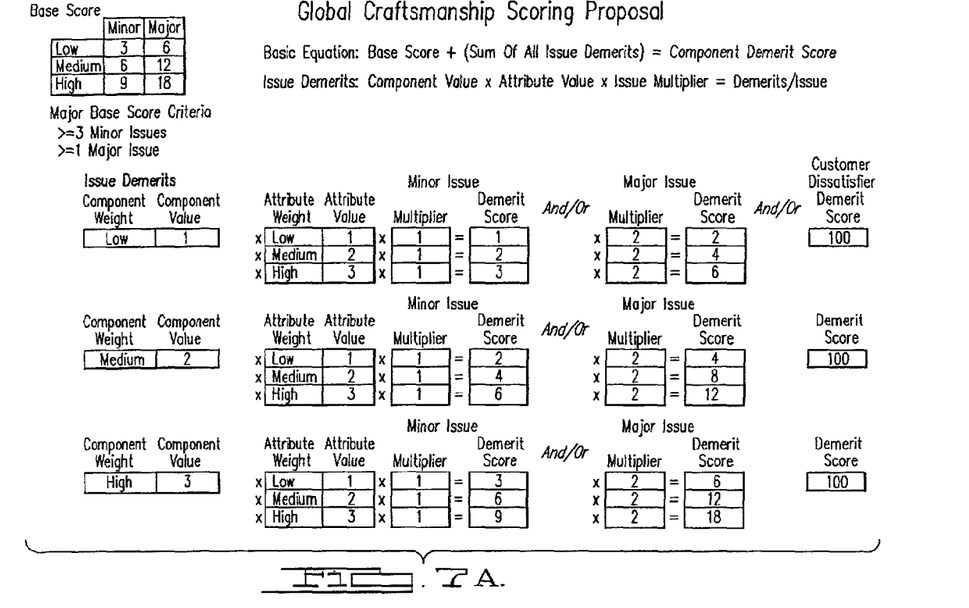
FIGS. 7A, 7B, and 8 are diagrammatic views illustrating rating a vehicle by an auditor for the method of FIG. 2.
Figure 7B:
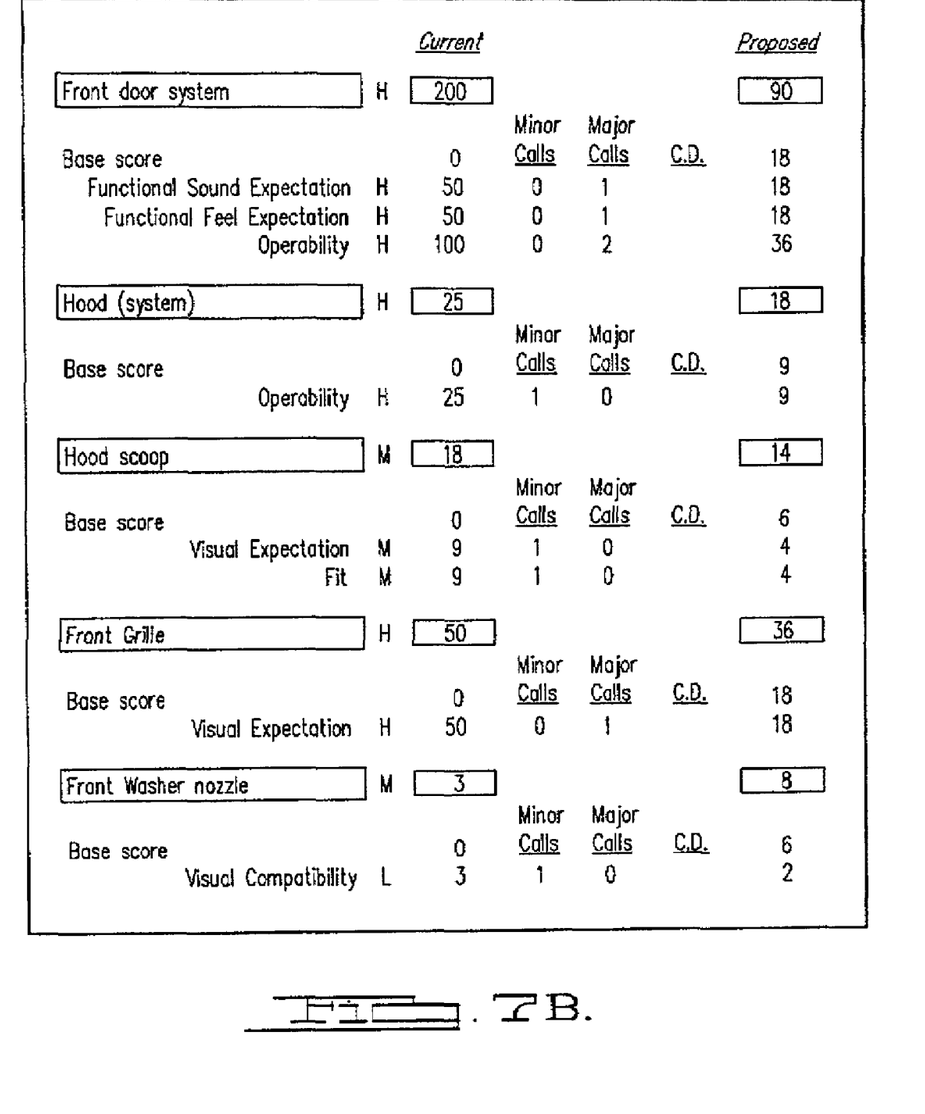
Figure 8:
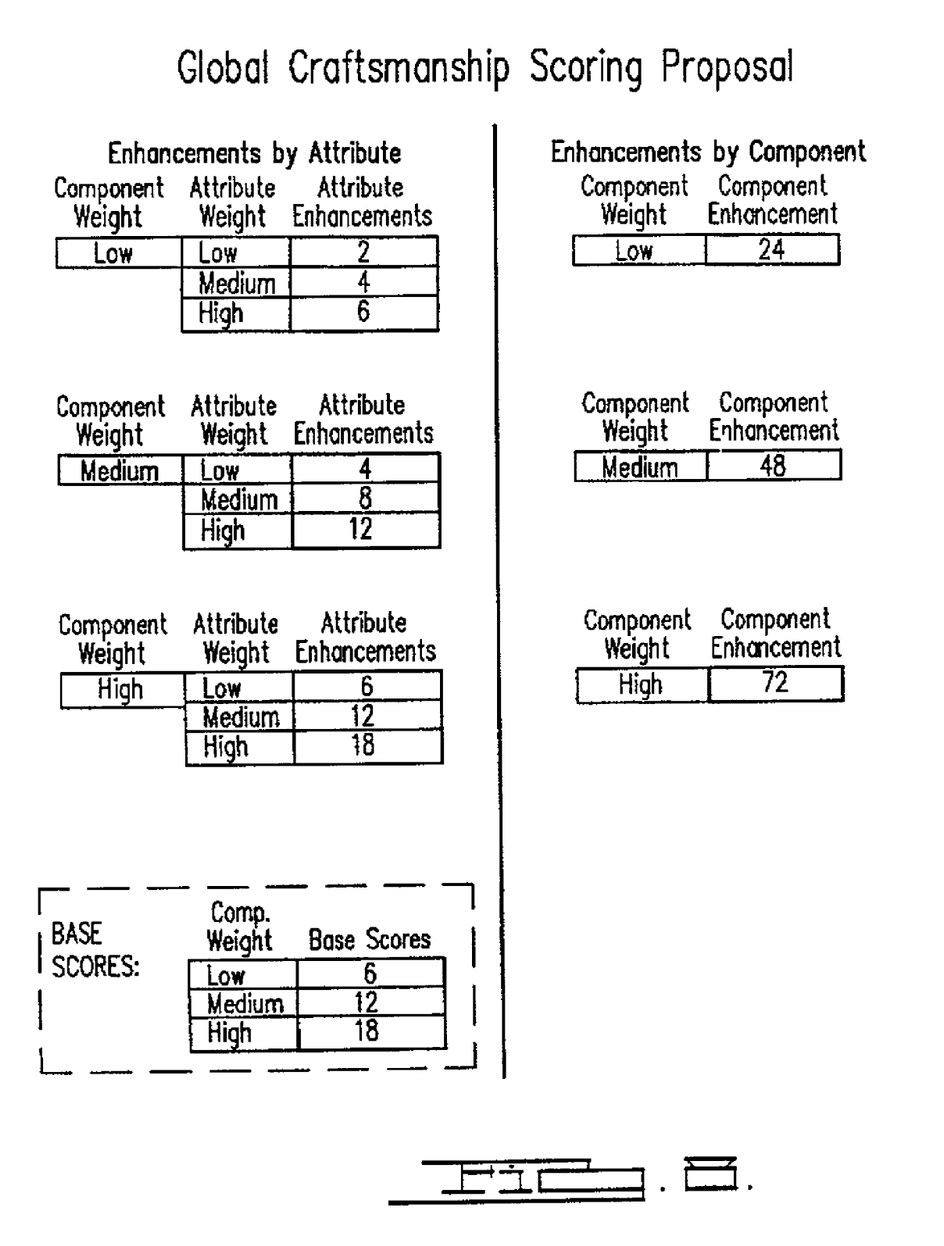

The method advances to block 110 and builds a GCARS database from the GCARS software in block 108. The GCARS database holds the rating data that can be manipulated to calculate an actual rating for the vehicle. For example, the rating data may be tailored to a specific vehicle brand or segment. From block 110, the method may advance to block 112 and generate a GCARS summary report from the GCARS software as illustrated in FIG. 6. The GCARS summary report may be a report of demerits for a particular vehicle or a report of enhancements for a particular vehicle as illustrated in FIGS. 7A, 7B, and 8. From the GCARS summary report, a vehicle program or model team can analyze the vehicle from a plurality of zones, for example the front of the vehicle or the interior of the vehicle. From block 110, the method may advance to block 114 and evaluate craftsmanship ratings for competitive vehicles. The competitive craftsmanship ratings summarize a particular manufacturer's vehicles against competitor vehicles. It should be appreciated that the auditor may rate competitor vehicles in block 108, which data are held in the GCARS database in block 110.

From block 114, the method advances to block 116 and sets a target rating for a particular vehicle model. The vehicle program team sets the target rating for the vehicle model in a predetermined period of time. For example, the target rating may be set from one, being the worst, to ten, being the best, to be achieved in three years. The method may also advance from block 118 with Product Attributes Leadership Strategy (PALS) to block 116 to set the target rating for the vehicle model. For example, the vehicle may be branded such as a luxury vehicle versus a compact vehicle. The method may advance from block 120 with futuring to block 116 to set the target rating for the vehicle model. For example, the target rating may be set from one to ten for continuous improvement of the vehicle model. It should be appreciated that futuring is based on competitors not being idle, and that they continue to improve craftsmanship in the future.

In block 116, the method sets the target rating for the vehicle model. The method may advance from either block 110 or block 116 to block 122 and performs a "what if" analysis to improve craftsmanship for the vehicle model. The method automatically generates a program roadmap or potential worksheet "what if" analysis to identify issues that resolve a gap from the actual rating to the target rating. For example, the potential worksheet shows that the actual rating is a six and the target rating is set at seven for a particular component such as a door handle of the vehicle. The database feeds data to the worksheet and the vehicle program team may want to fix the door handle, but the database ranks this craftsmanship issue low, in effect saying that this craftsmanship issue is not a priority to customers. The worksheet is a spreadsheet that identifies craftsmanship issues from the auditor's rating data and prioritizes the craftsmanship issues so that if a craftsmanship issue is fixed, then the vehicle model gets improvement of points in craftsmanship ratings. It should be appreciated that the system 10 is used to evaluate vehicles for craftsmanship and the results are automatically fed in a program road map or worksheet, which will allow the vehicle program team to identify and prioritize the corrective actions that need to be implemented in order to improve the overall craftsmanship of the vehicle. It should also be appreciated that the worksheet provides real time analysis of craftsmanship issues.

From block 122, the method advances to diamond 124 and determines whether the gap from the actual rating to the target rating is resolved. For example, the vehicle program team uses the worksheet to determine that, if a particular craftsmanship issue was fixed, the target rating would be achieved. If not, the method advances to block 126 and the vehicle program team picks another craftsmanship issue. For example, if the vehicle program team cannot fix the original craftsmanship issue chosen, the vehicle program team chooses another craftsmanship issue on the vehicle that can be addressed to improve the points in the ratings to achieve the target rating. After block 126, the method advances to block 122 previously described. It should be appreciated that if the craftsmanship issue could not be fixed, the craftsmanship issue is transferred to a vehicle program team for the next model year of the vehicle.

Figure 9A:
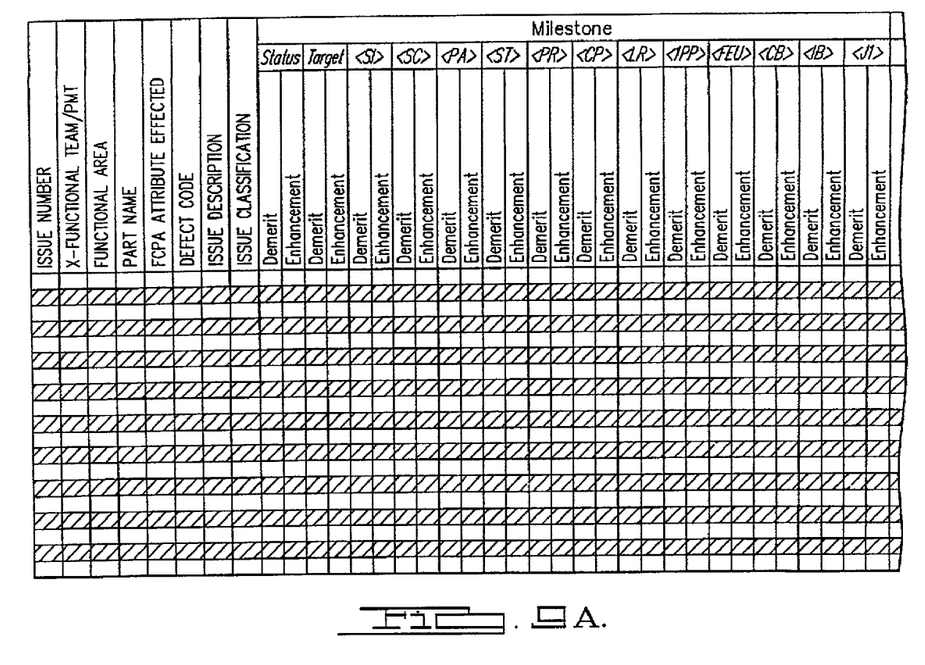
FIGS. 9A and 9B are diagrammatic views of an implementation plan for the method of FIG. 2.
Figure 9B:
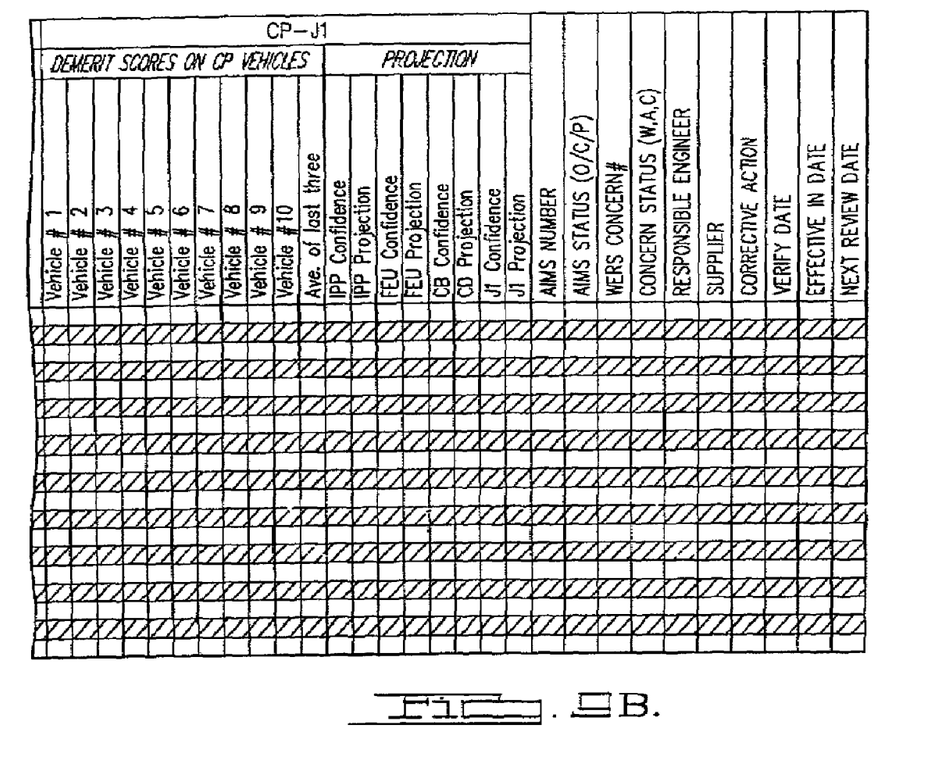

If the gap from the actual rating to the target rating is resolved in diamond 124, the method advances to block 128 and identifies an implementation plan. For example, subsets of the total issues that can be fixed are housed in a format to track their progress, such as potential gap to target, potential ratings with actions, responsible person, etc., as illustrated in FIGS. 9A and 9B. While the vehicle program team is tracking gaps during the implementation phase, the component/system database is being updated and tells auditors what was fixed. From block 128, the method advances to block 130 and loads the craftsmanship issues chosen into a manufacturing issue tracking system such as an Automated Issue Matrix System (AIMS). It should be appreciated that this manufacturing issue tracking system is used by Vehicle Operations in launching a vehicle.

From block 130, the method advances to block 132 and a supplier and Program Module Team (PMT) review, investigate and analyze each craftsmanship issue. The PMT is the liaison from the vehicle manufacturer to the supplier base. For example, the automotive vehicle manufacturer may have a PMT for interior trim, which is supplied by an outside supplier. Together the PMT and supplier investigate and analyze the craftsmanship issue, pertaining to components such as a headliner for the interior trim. From block 132, the method advances to diamond 134 and determines whether corrective action is feasible for the craftsmanship issue. For example, the supplier determines whether or not the craftsmanship issue investigated and analyzed, pertaining to the headliner, can be fixed. If not, the method advances to diamond 136 and determines whether there is craftsmanship PMT concurrence. For example, the PMT has to agree that the corrective action is not feasible for the craftsmanship issue. If the PMT agrees, the method advances to block 126 as previously described. If the PMT does not agree, the method advances to block 132 previously described.

In diamond 134, if the corrective action is feasible for the craftsmanship issue, the method advances to block 138 and implements the corrective action. For example, the supplier fixes the craftsmanship issue such as changing the material of the headliner. From block 138, the method advances to block 140 and tracks the corrected craftsmanship issues in AIMS. For example, the corrected craftsmanship issues are tracked in AIMS because the vehicle program team is handing off these issues to manufacturing and they acknowledge only in AIMS. It should be appreciated that after a predetermined time such as four months the craftsmanship issues are closed in AIMS and manufacturing knows if the corrective actions have been taken.

From block 140, the method advances to block 142 and performs a gateway review. The gateway review is where management of the craftsmanship department of the vehicle manufacturer determines whether key milestones before "Job 1" have been met before the milestone occurs. For example, a review is undertaken of what the gap to the target rating was, what corrective action has been implemented, and whether the vehicle program team is ready to pass through the gateway. The management either allows or disallows the vehicle program team to proceed to the next milestone. The method then advances to block 144 and ends.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

The invention claimed is:

1. A system for rating craftsmanship of vehicles, comprising:
    a computer for receiving customer data relating to craftsmanship for a vehicle, building a component/system database from the collected customer data, rating the vehicle for craftsmanship based on component/system database to obtain an actual rating, setting a target rating for the vehicle based on the actual rating, identifying craftsmanship issues that resolve a gap from the actual rating to the target rating, and determining whether the identified craftsmanship issues will resolve the gap from the actual rating to the target rating.

2. A system as set forth in claim 1 including an implementation plan for the craftsmanship issues stored in said computer.

3. A system as set forth in claim 1 including a manufacturer tracking system communicating with said computer for loading the craftsmanship issues therein.

4. A system as set forth in claim 1 including means for investigating and analyzing the craftsmanship issues by a supplier and vehicle manufacturer.

5. A system as set forth in claim 1 including means for determining whether corrective action for the craftsmanship issues is feasible.

6. A system as set forth in claim 5 including means for determining concurrence by the vehicle manufacturer if the corrective action is not feasible.

7. A system as set forth in claim 5 including means for implementing the corrective action if the corrective action is feasible.

8. A system as set forth in claim 1 including means for picking another craftsmanship issue if the gap from the actual rating to the target rating is not resolved.

9. A system as set forth in claim 1 including a database of ratings stored in said computer.

10. A system as set forth in claim 1 including a worksheet analysis to identify issues that resolve the gap to the target stored in the computer.

11. A computer method of craftsmanship rating of vehicles, said method comprising the steps of:
    collecting customer data relating to craftsmanship for a vehicle;
    building a component/system database from the collected customer data;
    rating the vehicle for craftsmanship based on component/system database to obtain an actual rating;
    setting a target rating for the vehicle based on the actual rating;
    identifying craftsmanship issues that resolve a gap from the actual rating to the target rating; and
    determining whether the identified craftsmanship issues will resolve the gap from the actual rating to the target rating.

12. A computer method as set forth in claim 11 including the step of identifying an implementation plan for the craftsmanship issues.

13. A computer method as set forth in claim 11 including the step of loading the craftsmanship issues into a manufacturer tracking system.

14. A computer method as set forth in claim 11 including the step of investigating and analyzing the craftsmanship issues by a supplier and vehicle manufacturer.

15. A computer method as set forth in claim 11 including the step of determining whether corrective action for the craftsmanship issue is feasible.

16. A computer method as set forth in claim 15 including the step of determining concurrence by the vehicle manufacturer if the corrective action is not feasible.

17. A computer method as set forth in claim 15 implementing corrective action is the corrective action is feasible.

18. A computer method as set forth in claim 11 including the step of picking another craftsmanship issue if the gap from the actual rating to the target rating is not resolved.

19. A computer method as set forth in claim 11 including the step of building a database of craftsmanship ratings.

20. A computer method as set forth in claim 11 including the step of using a worksheet analysis to identify issues that resolve the gap from the actual rating to the target rating.

* * * * *